United States Patent
Ryu et al.

(10) Patent No.: US 10,938,459 B2
(45) Date of Patent: Mar. 2, 2021

(54) REDUCTION OF SELF-INTERFERENCE IN FULL-DUPLEX COMMUNICATION

(71) Applicant: QUALCOMM Incorporated, San Diego, CA (US)

(72) Inventors: Jung Ho Ryu, Fort Lee, NJ (US); Tianyang Bai, Bridgewater, NJ (US); Kiran Venugopal, Raritan, NJ (US); Makesh Pravin John Wilson, San Diego, CA (US); Tao Luo, San Diego, CA (US); Raju Hormis, New York, NY (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/409,529

(22) Filed: May 10, 2019

(65) Prior Publication Data
US 2020/0358500 A1    Nov. 12, 2020

(51) Int. Cl.
*H04L 7/08* (2006.01)
*H04B 7/06* (2006.01)
*H04L 5/14* (2006.01)

(52) U.S. Cl.
CPC ........... *H04B 7/061* (2013.01); *H04B 7/0632* (2013.01); *H04L 5/14* (2013.01)

(58) Field of Classification Search
CPC ...... H04B 7/061; H04B 7/0632; H04B 7/088; H04L 5/24
See application file for complete search history.

(56) References Cited

U.S. PATENT DOCUMENTS

| 2012/0197934 | A1* | 8/2012 | Zhang ................. G06F 16/4568 707/770 |
| 2013/0022083 | A1 | 1/2013 | Vasseur et al. |
| 2013/0170435 | A1 | 7/2013 | Dinan |
| 2018/0309464 | A1* | 10/2018 | Mandegaran ............ H04B 1/52 |
| 2019/0081688 | A1* | 3/2019 | Deenoo ................. H04L 5/0069 |

FOREIGN PATENT DOCUMENTS

| WO | 2018144844 A1 | 8/2018 |
| WO | 2018204255 A1 | 11/2018 |

OTHER PUBLICATIONS

International Search Report and Written Opinion—PCT/US2020/032082—ISAEPO—dated Jul. 6, 2020.

* cited by examiner

*Primary Examiner* — Wei Zhao
(74) *Attorney, Agent, or Firm* — Patterson + Sheridan, L.L.P.

(57) ABSTRACT

Certain aspects of the present disclosure provide a method for changing a beam pair utilized by a user equipment (UE) for communicating over a full-duplex frequency channel. The method includes establishing full-duplex communication with a base station (BS) utilizing a first beam pair comprising a first uplink beam and a first downlink beam utilized by the UE for the full-duplex communication. The method also includes transmitting a first signal to the BS, the first signal comprising a request to change the first beam pair. The method also includes receiving, via the first downlink beam, a second signal responsive to the request, the second signal configured to enable the UE to change from the first beam pair to a second beam pair and maintain full-duplex communication with the BS, wherein the second beam pair includes one or more of a second uplink beam or a second downlink beam.

30 Claims, 9 Drawing Sheets

REDUCTION OF SELF-INTERFERENCE IN FULL-DUPLEX COMMUNICATION

BACKGROUND

Field of the Disclosure

Aspects of the present disclosure relate to wireless communications, and more particularly, to techniques for reducing self-interference at user equipment during full-duplex communication.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, 5G, new radio (NR), to name a few.

In some examples, a wireless multiple-access communication system may include a number of base stations (BSs), which are each capable of simultaneously supporting communication for multiple communication devices, otherwise known as user equipment (UEs). Such systems support bi-directional communications for multiple users by sharing available network resources and communicating over either time division duplexing (TDD) or frequency division duplexing (FDD). In either TDD or FDD, communication utilizing a single frequency channel is only possible in one direction at any given instant of time. Thus, TDD and FDD networks implement bi-directional communication by either utilizing multiple frequency channels, as in the case of FDD, or by dividing the two directions of communication according to allocated time slots, as in the case of TDD.

With technological improvements to digital filtering, bi-directional communication using true radio level full-duplex communication is becoming feasible. Full-duplex communication operates by concurrent transmission and reception in a single time and frequency channel, thereby improving spectral efficiency by a factor of two relative to conventional half-duplex (HD) wireless systems (e.g., half-duplex packet mode networks), and bi-directional wireless systems (e.g., TDD/FDD networks). While digital filtering offers mitigation of interference caused by full-duplex communication, such filtering can pose problems. For example, embedding digital filter hardware into the highly integrated structures of mm-wave capable UEs can present challenges. Moreover, cost of producing the UE increases with the additional hardware.

Thus, as the demand for mobile broadband access continues to increase, research and development continue to advance wireless communication technologies not only to meet the growing demand for mobile broadband access, but to advance and enhance the user experience.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to reducing self-interference by determining beam pairing at user equipment (UE) for full-duplex communication.

Certain aspects provide a method for managing UE self-interference by a base station (BS). The method generally includes receiving a first signal comprising a request to change a first beam pair, wherein the first beam pair includes a first uplink beam and a first downlink beam utilized by the UE for full-duplex communication with the BS, and wherein the first signal is communicated by the first uplink beam. The method further includes determining a second beam pair based on one or more communication parameters of the full-duplex communication, and transmitting a second signal to the UE, wherein the second signal is configured to be received by the UE via the first downlink beam, and wherein the second signal is responsive to the request and configured to enable the UE to change the first beam pair to the second beam pair and maintain full-duplex communication with the BS.

Certain aspects provide a BS configured for managing self-interference at a UE. The BS generally includes a memory and a processor communicatively coupled to the memory, wherein the processor is generally configured to receive a first signal comprising a request to change a first beam pair, wherein the first beam pair includes a first uplink beam and a first downlink beam utilized by the UE for full-duplex communication with the BS, and wherein the first signal is communicated by the first uplink beam. The processor is also configured to determine a second beam pair based on one or more communication parameters of the full-duplex communication, and transmit a second signal to the UE, wherein the second signal is configured to be received by the UE via the first downlink beam, and wherein the second signal is responsive to the request and configured to enable the UE to change the first beam pair to the second beam pair and maintain full-duplex communication with the BS.

Certain aspects provide a method of managing self-interference by a UE. The method generally includes establishing full-duplex communication with a base station (BS) utilizing a first beam pair, the first beam pair comprising a first uplink beam and a first downlink beam utilized by the UE for the full-duplex communication. The method also includes transmitting, via the first uplink beam, a first signal to the BS, the first signal comprising a request to change the first beam pair, and receiving, via the first downlink beam, a second signal responsive to the request, the second signal configured to enable the UE to change from the first beam pair to a second beam pair and maintain full-duplex communication with the BS, wherein the second beam pair includes one or more of a second uplink beam or a second downlink beam.

Certain aspects provide a UE configured for managing self-interference in a full-duplex communication. The UE generally includes a memory and a processor communicatively coupled to the memory, wherein the processor is generally configured to establish full-duplex communication with a base station (BS) utilizing a first beam pair, the first beam pair comprising a first uplink beam and a first downlink beam utilized by the UE for the full-duplex communication. The processor is also configured to transmit, via the first uplink beam, a first signal to the BS, the first signal comprising a request to change the first beam pair, and receive, via the first downlink beam, a second signal responsive to the request, the second signal configured to enable the UE to change from the first beam pair to a second beam pair and maintain full-duplex communication with the BS, wherein the second beam pair includes one or more of a second uplink beam or a second downlink beam.

To the accomplishment of the foregoing and related ends, the one or more aspects include the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
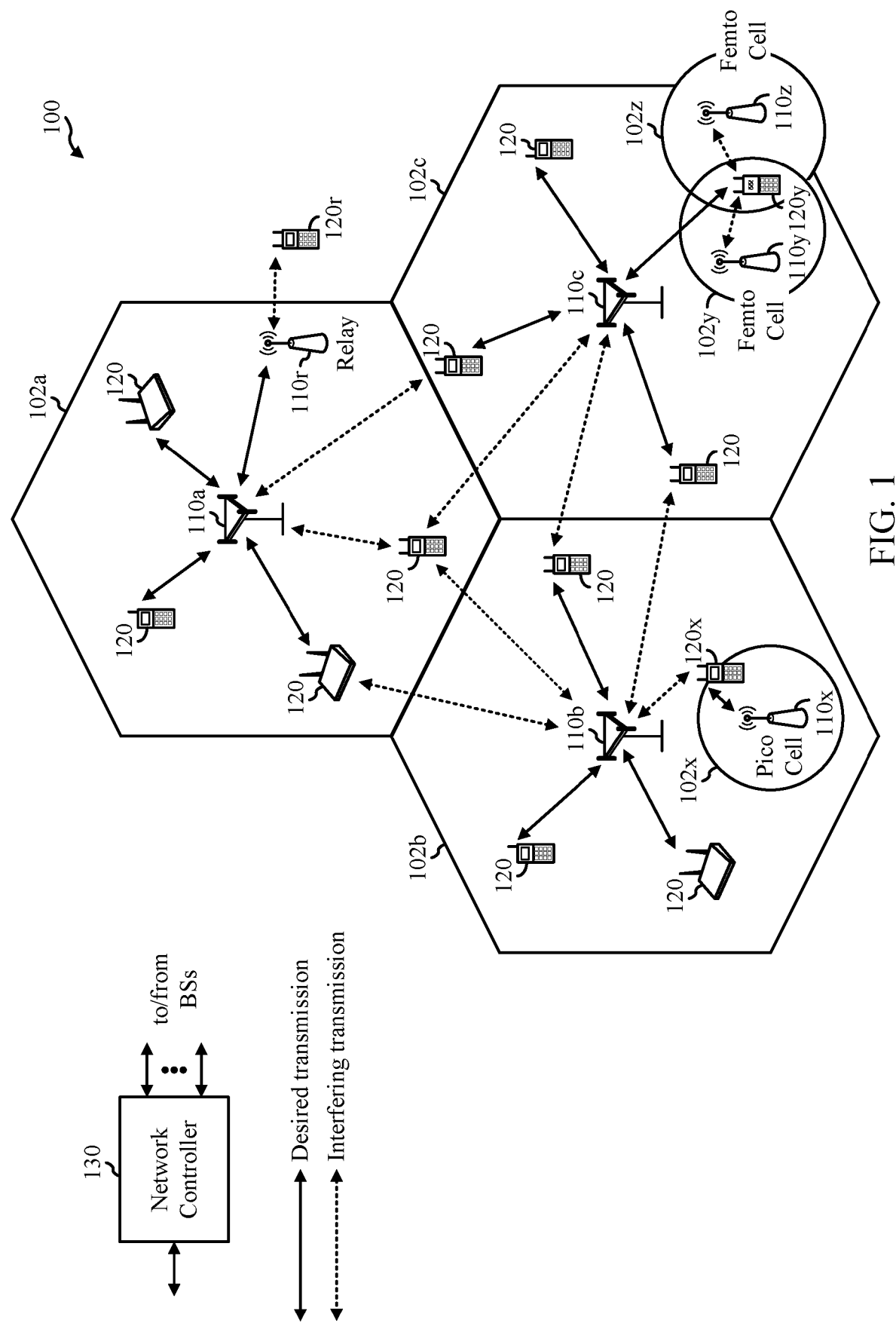
FIG. 1 is a block diagram conceptually illustrating an example telecommunications system, in accordance with certain aspects of the present disclosure.

Aspects of the present disclosure provide apparatus, methods, processing systems, and computer readable mediums for changing a beam pair at a user equipment (UE) to reduce self-interference in a full-duplex communication. As used herein, a communication is considered to be full-duplex if it supports concurrent transmission and reception at the same time and frequency resources, meaning at the same time using the same one or more frequencies (e.g., in a single time and frequency channel). A beam pair relates to a pair of directional beams for directional transmission and reception of signals. For example, a UE may have multiple antenna arrays, such that at least one antenna array can be used for reception and another antenna array can be used for transmission at the same time. Each antenna array includes two or more antennas connected together to function as a single antenna array. For example, for a given antenna array, the amplitude gain and/or phase offset applied to signals transmitted/received using each antenna of the antenna array may be separately configured (e.g., precoded or controlled) to increase the gain in one or more directions and decrease the gain in one or more other direction such that transmission/reception is essentially beamformed in a particular direction referred to as a directional beam.

From the UE perspective, a beam pair includes an UL beam and a DL beam having directional characteristics controlled by the UE antenna array. Signals transmitted by the UE over an uplink (UL) beam of the UE can cause self-interference at a downlink (DL) beam of the UE used by the UE for reception in full duplex mode. Accordingly, the self-interference may need to be reduced or eliminated in order for the UE to detect a signal from another device (e.g., a base station (BS)) for reception over the DL beam. Certain aspects of the present disclosure relate to techniques for reducing or eliminating self-interference between a beam pair (i.e., UL beam and DL beam) at the UE.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (SGTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. As shown in FIG. 1, a user equipment (UE), such as the UE 120 in the wireless communication network 100 communicates with a serving base station (BS), such as the BS 110a in a cell 102a. The UE 120 may be configured with multiple transmission configurations (e.g., to use particular antenna arrays/panels and/or beams for transmission) suitable for full-duplex communication over a frequency channel with the BS 110a.

In some configurations, the UE 120 communicates with the BS 110a (e.g., gNode B/eNode B) utilizing antenna arrays each having two or more antennas. The antenna arrays are configured to transmit and receive data in full duplex mode utilizing a beam pair that includes an UL beam and a DL beam, respectively. The BS 110a and the UE 120 may perform channel state feedback operations and/or beam sweep operations to determine whether self-interference is being generated at the UE 120 by a signal transmitted on the UL beam of the beam pair. As used herein, the UE 120 is considered to be experiencing self-interference if the signal transmitted on the UL beam interferes with, or introduces noise to, a signal concurrently received on the DL beam.

As illustrated in FIG. 1, the wireless communication network 100 may include a number of base stations (BSs) 110 (e.g., gNode B/eNode B) and other network entities. A BS may be a station that communicates with user equipment (UE). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110*a* and the UE 120*r*. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120*x*, 120*y*, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the DL and single-carrier frequency division multiplexing (SC-FDM) on the UL. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the UL and DL and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the DL and/or UL. A finely dashed line with double arrows indicates interfering transmissions between a UE and a BS.

Figure 2:
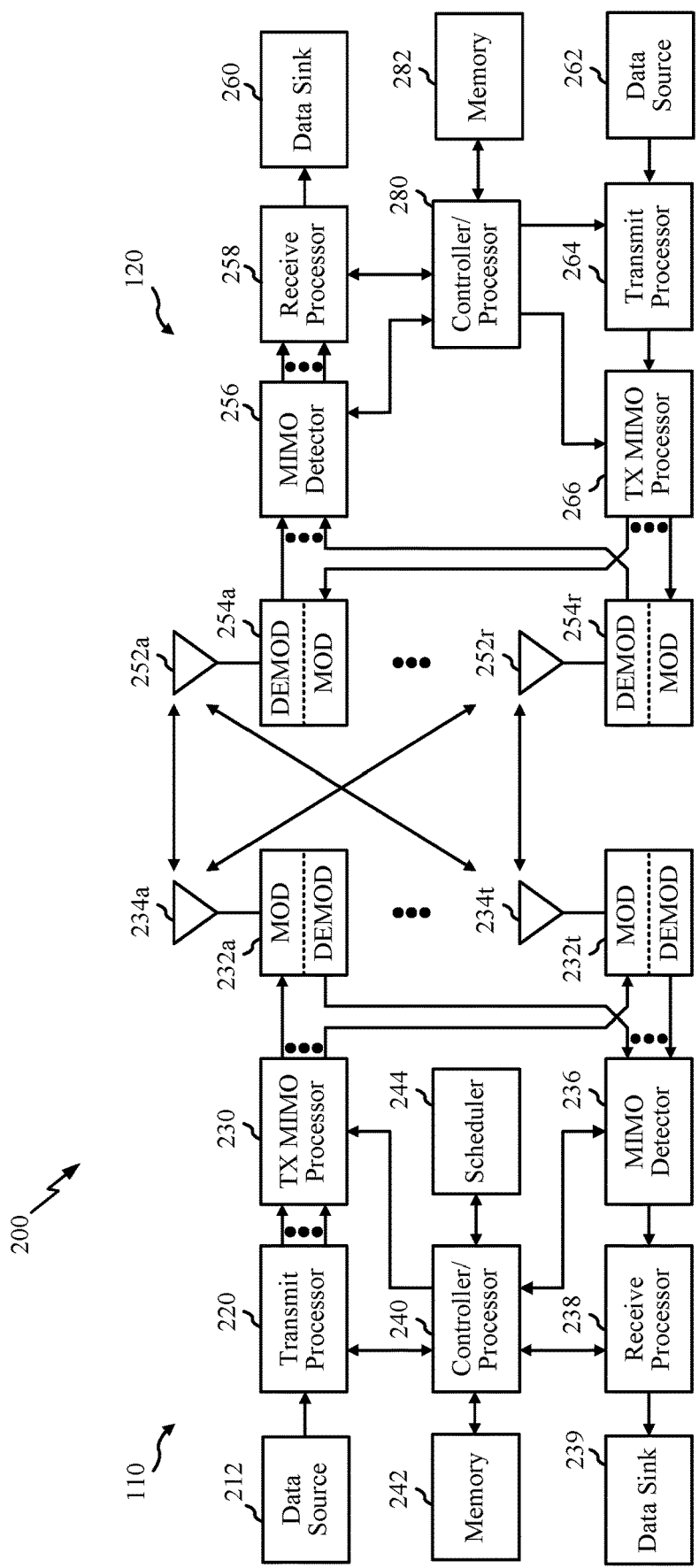
FIG. 2 is a block diagram conceptually illustrating a design of an example base station (BS) and user equipment (UE), in accordance with certain aspects of the present disclosure.

FIG. 2 illustrates example components of BS 110 and UE 120 (as depicted in FIG. 1) configured for beamforming and/or MIMO technology, which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein.

In a MIMO system, the BS 110 and the UE 120 include multiple antennas (234*a* through 234*t* and 252*a* through 252*r*) to generate a plurality of signal paths between the UE 120 and the BS 110. The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the DL. The spatially precoded data streams arrive at the UE(s) with different spatial signatures, which enables each of the UE(s) to recover the one or more data streams destined for that UE. On the UL, each UE transmits a spatially precoded data stream, which enables the base station to identify the source of each spatially precoded data stream.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical DL control channel (PDCCH), group common PDCCH (GC PDCCH), etc. The data may be for the physical DL shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a* through 232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a DL signal. DL signals from modulators 232*a* through 232*t* may be transmitted via the antennas 234*a* through 234*t*, respectively.

At the UE 120, the antennas 252*a* through 252*r* may receive the DL signals from the base station 110 and may provide received signals to the demodulators (DEMODs) in transceivers 254*a* through 254*r*, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254*a* through 254*r*, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the UL, at UE 120, a transmit processor 264 may receive and process data (e.g., for the physical UL shared channel (PUSCH)) from a data source 262 and control information (e.g., for the physical UL control channel (PUCCH) from the controller/processor 280. The transmit processor 264 may also generate reference symbols for a reference signal (e.g., for the SRS). Reference signals may provide for a receiving device to perform channel estimation and self-interference measurements over a corresponding beam. The symbols from the transmit processor 264 may be precoded by a TX MIMO processor 266 if applicable, further processed by the demodulators in transceivers 254*a* through 254*r* (e.g., for SC-FDM, etc.), and transmitted to the base station 110. At the BS 110, the UL signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the DL and/or UL.

Figure 3:
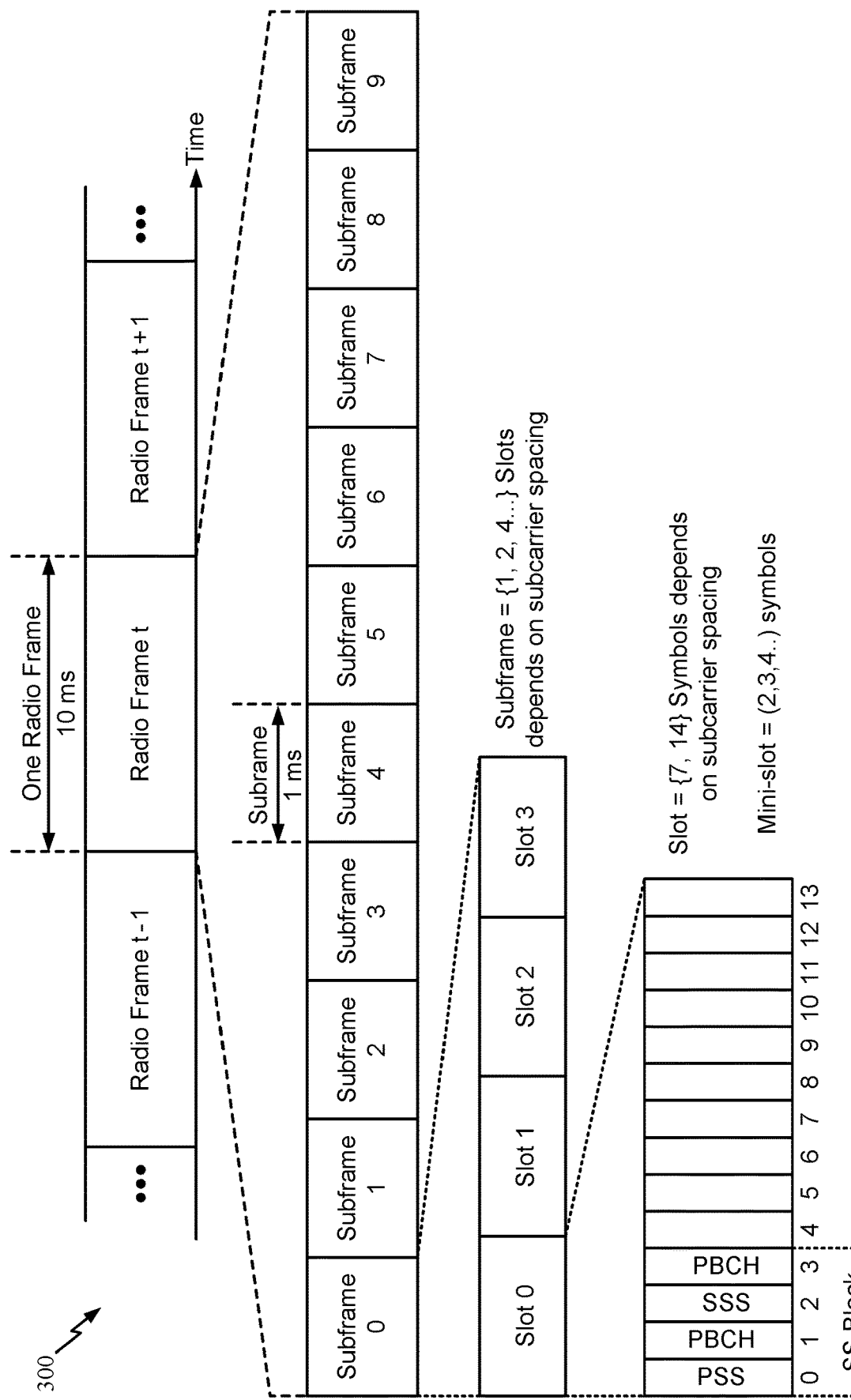
FIG. 3 illustrates an example of a frame format for a telecommunication system, in accordance with certain aspects of the present disclosure.

FIG. 3 is a diagram showing an example of a frame format 300 for NR. Signals transmitted and received over a beam pair at either of a UE 120 or a BS 110 may be structured and partitioned into radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., HD DL, HD UL, full-duplex DL and UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location. The PSS and SSS may be used by UEs for cell search and acquisition. The PSS may provide half-frame timing, the SS may provide the CP length and frame timing. The PSS and SSS may provide the cell identity. The PBCH carries some basic system information, such as DL system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical DL shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Example Techniques for Reducing Self-Interference at the UE

Figure 4:
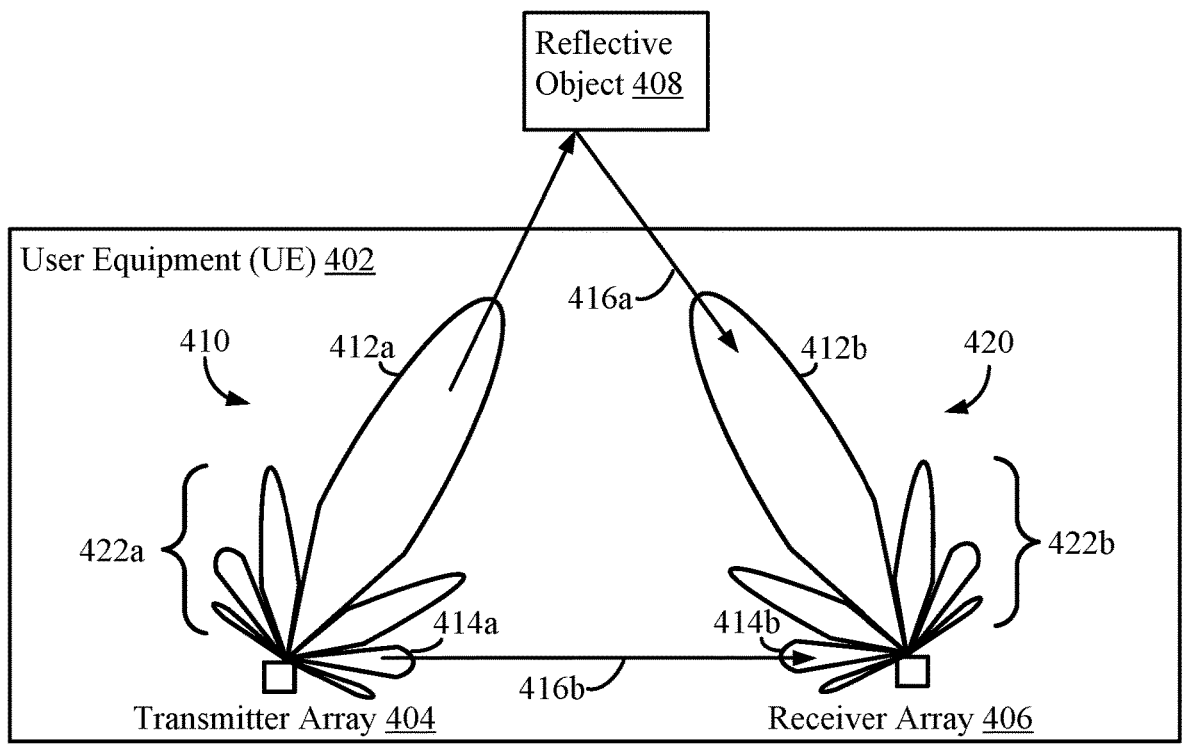
FIG. 4 is a block diagram conceptually illustrating a UE experiencing self-interference, in accordance with certain aspects of the present disclosure.

FIG. 4 is a conceptual diagram illustrating a UE 402 (e.g., corresponding to a UE 120 of FIG. 1) utilizing a beam pair having an UL beam 410 and a DL beam 420 for full-duplex communication. The UL beam 410 is configured to provide a UE-side transmitter beam direction, while the DL beam 420 is configured to provide a corresponding UE-side receiver beam direction. Jointly, the UL beam 410 and the DL beam 420 provide communication with a BS (e.g., corresponding to a BS 110 of FIG. 1) or other wireless node (e.g., core network node) over a full-duplex frequency channel. In this example, the UE 402 includes a transmit antenna array 404 and a receive antenna array 406, each configured to communicate over a full-duplex, mmWave frequency channel using the beam pair.

An antenna array may include two or more antennas that are spatially arranged and electrically interconnected to produce a directional radiation pattern. As an example, the transmit antenna array 404 and the receive antenna array 406 correspond to a plurality of physical antennas on the same UE 402, the antennas being spatially arranged and electrically interconnected to produce a directional radiation pattern. The transmit antenna array 404 is configured to transmit an UL signal utilizing a directional UL beam 410. The receive antenna array 406 is configured to receive a DL signal utilizing a directional DL beam 420.

Each of the UL beam 410 and the DL beam 420 include a main lobe (412a and 412b) corresponding to the main direction of that beam (i.e., the direction that most of the beam energy is radiated/received). In the example of FIG. 4, a signal 416a transmitted by the UL beam 410 is reflected off a nearby object 408 and directed toward the DL beam 420. The object 408 may be closer to the UE 402 than a BS or another UE communicating with the UE. For example, the object can be a computer monitor, a user's head, or another nearby object with reflective properties. This reflection causes self-interference because the reflected signal 416a is received by the DL beam 420 at a relatively higher (increased) power than a signal transmitted by the BS.

Each of the UL beam 410 and the DL beam 420 also include a plurality of side lobes (422a and 422b) corresponding to far-field radiation patterns generated by the transmitter antenna array 404 and the receiver antenna array 406. In this example, a signal 416b transmitted by a first side lobe 414a of the transmitter antenna array 404 is directed toward a second side lobe 414b of the receiver antenna array 406. Although the side lobes (422a and 422b) have relatively less power than the main lobes (412a and 412b), the close proximity of the transmitter antenna array 404 to the receiver antenna array 406 can result in self-interference due to the signal 416b being received at a relatively higher power than a signal transmitted by the BS.

It will be appreciated that the signal strength of an UL signal transmitted by the transmitter array 404 as measured by the receiver array 406 is likely to be much stronger than a signal transmitted to the UE 402 by a BS. Accordingly, whether the UL signal is reflected toward the receiver array 406 or otherwise directed toward the receiver array from a side lobe 422a, the self-interference caused by that UL signal is likely to be much stronger than the BS signal, as the strength of the BS signal is inversely proportional to the square of the distance from the source. In certain instances, because the strength of the self-interference signal is stronger than the strength of the BS signal, the UE 402 is unable to detect the BS signal over the self-interference. Thus there exists a need to reduce the effects of self-interference by utilizing certain beam pairs such that in the reflection example, the transmit beam points away from the reflector and/or the receive beam points away from the reflector.

Figure 5:
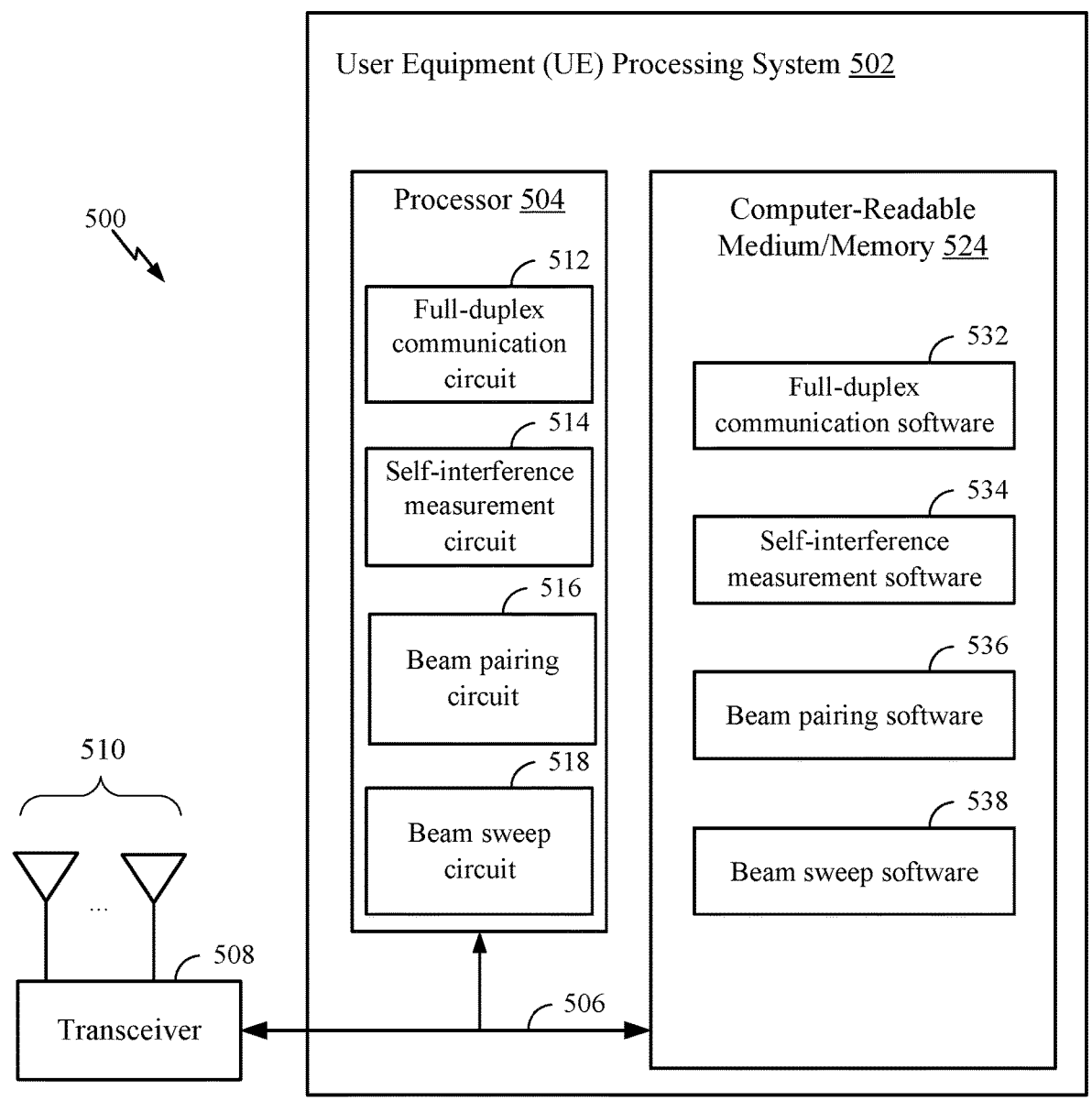
FIG. 5 is a block diagram conceptually illustrating a UE configured to perform operations for the techniques disclosed herein.

FIG. 5 illustrates a user equipment (UE) 500 including various components (e.g., corresponding to means-plus-function components) configured to perform operations according to some aspects of the disclosure. For example, the UE 500 may be used to implement any one or more of the operations described below and illustrated in FIGS. 7 and 9. The UE 500 of FIG. 5 may include a UE as illustrated in any of FIGS. 1, 2, 4, and 7.

The UE 500 includes a processing system 502 coupled to a transceiver 508. The transceiver 508 includes multiple antennas 510 corresponding to multiple antenna arrays configured to transmit and receive signals for the UE 500, such as the various signals described herein. The transceiver 508 provides a means for communicating with various other communications devices over a wireless interface. In various examples, the transceiver 508 includes multiple antennas 510 configured for directional signal transmission or reception. For example, the transceiver 508 in coordination with the processing system 502, may control the amplitude gain and phase offset of each antenna 510 to communicate over a full-duplex frequency channel utilizing one or more beam pairs. The transceiver 508 may include various subcomponents configured to enable wireless communication, including but not limited to one or more power amplifiers, a transmitter, a receiver, filters, oscillators, etc.

The processing system 502 includes a processor 504 coupled to a computer-readable medium/memory 524 via a bus 506. The bus 506 may include any number of interconnecting buses and bridges depending on the specific application of the processing system 502 and the overall design constraints. The bus 506 communicatively couples together various circuits including one or more processors/controllers (represented generally by the processor 504), and a computer-readable medium and memory (represented generally by the computer-readable medium/memory 524). The bus 506 may also link various other circuits such as timing sources, peripherals, voltage regulators, and power management circuits, which are well known in the art, and therefore, will not be described any further.

In certain aspects, the computer-readable medium/memory 524 is configured to store instructions (e.g., computer-executable code) that when executed by the processing system 502, causes the processor 504 to perform the various functions described below. The computer-readable medium 524 may also be used for storing data that is manipulated by the processor 504 when executing software, or received by the transceiver 508.

The processor 504 may be configured to perform processing functions for the UE 500, including processing signals received and/or to be transmitted by the UE 500. For example, the processor 504 may include a full-duplex communication circuit 512, which can function in coordination with full-duplex communication software 532. Here, the full-duplex communication circuit 512 and/or software 532 utilize the transceiver 508 to enable full-duplex communication with one or more other communication devices (e.g., BS 600, described below) utilizing mmWave full-duplex communication techniques. In some configurations, the full-duplex communication circuit 512 is also configured to support half-duplex communication techniques with the one or more other communication devices (e.g., BS 600).

The processor 504 may further include a self-interference measurement circuit 514, which may function in coordination with self-interference measurement software 534. Here, the self-interference measurement circuit 514 and/or software 534 are configured to measure self-interference of a signal received at the transceiver 508. In some configurations, the self-interference measurement circuit 514 and/or software 534 is configured to measure: (i) the signal strength of a signal received from a BS, and (ii) the signal strength of a signal transmitted from an UL beam of a beam pair utilized by the UE 500 and received by a DL beam of the beam pair.

The self-interference measurement circuit 514 and/or software 534 may utilize any suitable self-interference measurement algorithm or technique, including but not limited to transmit-signal reconstruction (e.g., using a digital baseband signal and/or transceiver output signal, channel response estimation, transceiver non-linearity modeling etc.), signal power measurement (e.g., received signal strength indication (RSSI), reference signal received power (RSRP) measurement, etc.), reference signal received quality (RSRQ), signal-to-noise ratio (SNR), signal-to-self-interference-and-noise ratio (SINR), etc. That is, self-interference measurement circuit 514 and/or software 534 may be configured to measure and determine information indicative of self-interference at the transceiver 508.

The processor 504 may further include a beam pairing circuit 516, which may function in coordination with beam pairing software 536. Here, the beam pairing circuit 516 and/or software 536 may determine alternative beam pairs for the transceiver 508 to utilize for communication with the BS 600 based on one or more communication parameters, beam parameters, and/or self-interference information. Further, the beam pairing circuit 516 and/or software 536 may function to reduce or eliminate self-interference in coordination with the transceiver 508 by changing a beam pair utilized by the UE 500 to another beam pair. For example, the beam pairing circuit 516 and/or software 536 can direct the transceiver 508 to change a beam pair utilized by the UE 500 by adjusting the amplitude gain, phase offset, and/or other characteristics used for beamforming at one or more antennas 510 based on measurements and information determined by the self-interference measurement circuit 514.

Generally, the beam pair can be characterized by one or more communication parameters of a full-duplex communication and/or beam parameters of beams used (or to be used) in the full-duplex communication. Communication parameters include which antennas 510 of a plurality of antennas on the UE 500 are used for transmitting and receiving signals over an UL beam and DL beam of a beam pair. This communication parameter includes selecting one or more antennas 510 to use for transmitting and/or receiving signals in a full-duplex communication with the BS 600. It will be appreciated that each of the plurality of antennas 510 on the UE 500 may not have the same spatial response to an UL signal transmitted from the UE 500. Thus, in certain aspects, the UE 500 may select an antenna 510 that has a lower incidence of interference from a UL signal than another antenna 510.

Another communication parameter may include whether the beam pair is used for full-duplex communication over one or more of a physical shared channel (e.g., PUSCH/PDSCH) or a physical control channel (e.g., PUCCH/PDCCH). In some embodiments, data communicated over the physical control channel may be more sensitive or have a higher reliability requirement than data communicated over the physical shared channel. It will be appreciated that the UE 500 may communicate over both a physical shared channel and a physical control channel utilizing a single beam pair. Thus, in certain aspects, the UE 500 may determine to change the original beam pair as it is utilized for communicating over the physical control channel, but maintain the original beam pair for communicating over the physical shared channel.

Beam parameters may include physical information about a beam, including one or more of a beam direction, a transmit/receive power of a reference signal, a type of reference signal associated with a beam, a beam width, an SINR, a reference signal associated with a beam, or a strength of a beam side-lobe.

A beam direction, or beam form, includes the direction of a beam path utilized by the UE 500 to transmit or receive data over one or more antennas 510. It will be appreciated that the direction of a beam may be changed to reduce or eliminate self-interference caused by UL signaling. Similarly, the width of one or more beams in a beam pair can be changed to reduce self-interference. For example, relatively narrow beams may cause less self-interference than wider beams. In one example, beam power relates to the power allocated to a signal transmitted on the UL beam of the beam pair utilized by the UE 500 for maintaining full-duplex communication with the BS 600. It will be appreciated that a relatively lower power of an UL beam generates less interference than a beam having a higher power.

The processor 504 may further include a beam sweep circuit 518, which may function in coordination with beam sweep software 538. Here the beam sweep circuit 518 and/or software 538 enable the UE 500 to make periodic/aperiodic evaluations to determine possible beam adjustments. For example, the UE is configured to perform beam sweep operations at regular intervals, and can also perform beam sweep operations at irregular intervals (e.g., when self-interference is detected, the UE may initiate beam sweep operations without waiting for the next regular interval). In some configurations, and in conjunction with the full-duplex communication circuit 512, the beam sweep circuit 518 and/or software 538 enable the UE 500 to support a BS 600 beam sweep by measuring on a set of reference signals transmitted by the BS 600, where each reference signal of the set of reference signals correspond to a different DL beam.

In some configurations, the beam sweep circuit 518 and/or software 538 enable the UE 500 to perform a UE-side UL beam sweep & DL beam sweep by transmitting a set of reference signals over a plurality of UL beams by the UE 500. In conjunction with the self-interference measurement circuit 514, the beam sweep circuit 518 can determine self-interference information (e.g., SINR, RSRP) corresponding to each of the plurality of DL and UL beam pairs. Here, the beam sweep circuit 518 and/or software 538 can generate a report that includes self-interference information for transmission to the BS.

Accordingly, the UE 500 is configured to reduce the effects of self-interference caused by, for example, reflection by an object of a signal communicated over a full duplex communication using a first UE-side beam pair. For example, self-interference caused by such a reflection is measured by self-interference measurement circuit 514, which triggers the beam sweep circuit 518 to initiate a beam sweep operation. The beam pairing circuit 516 can then determine a second UE-side beam pair that the UE 500 can utilize to maintain the full-duplex communication.

Figure 6:
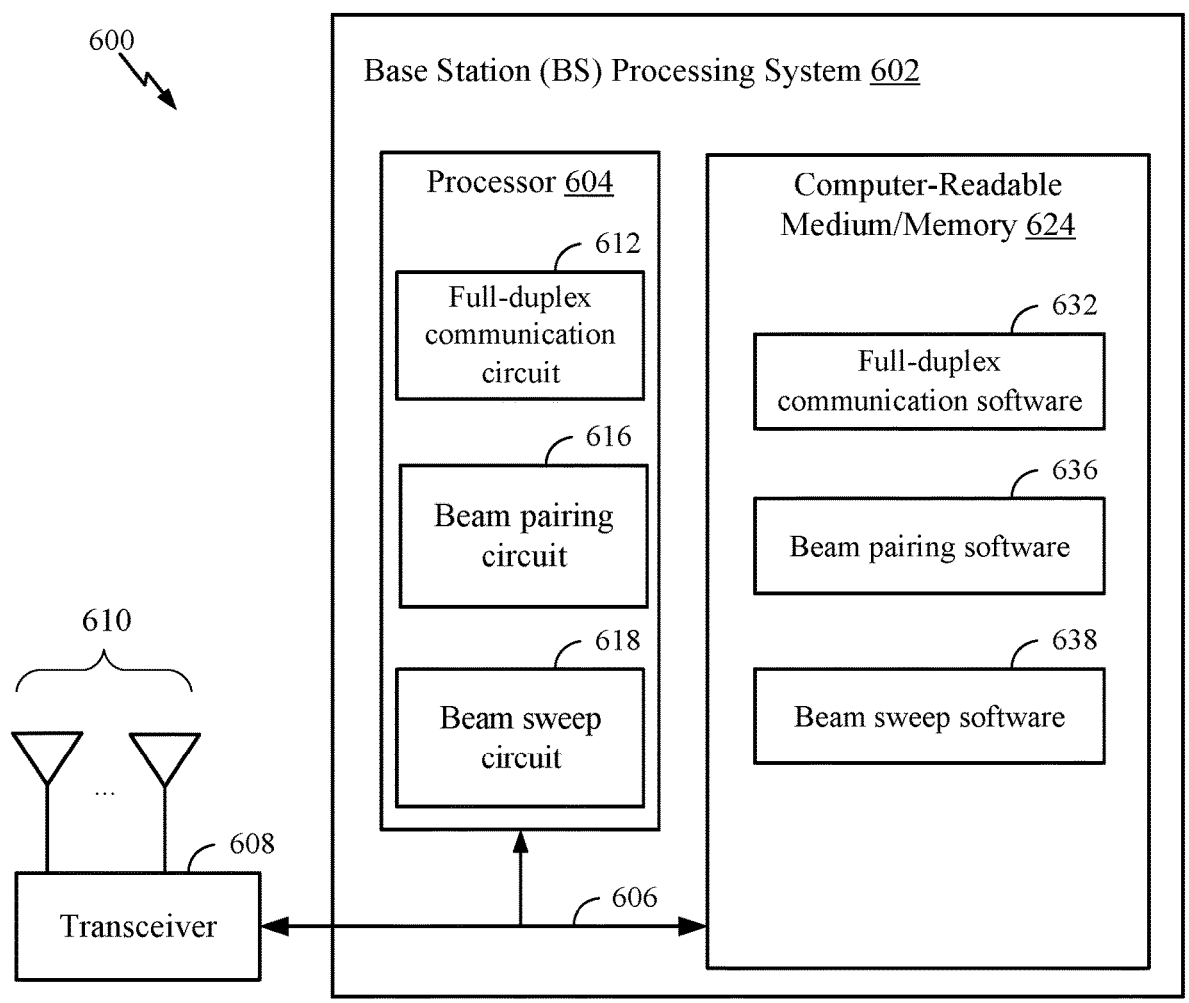
FIG. 6 is a block diagram conceptually illustrating a BS configured to perform operations for the techniques disclosed herein.

FIG. 6 illustrates a BS 600 that includes various components (e.g., corresponding to means-plus-function components) configured to perform operations according to some aspects of the disclosure. For example, the BS 600 may be used to implement any of the operations described below and illustrated in FIGS. 7 and 8. The BS 600 of FIG. 6 may include a BS as illustrated in any of FIGS. 1, 2, and 7.

The BS 600 has many components the same as or similar to those described above in relation to FIG. 5. For example, a bus 606, a transceiver 608, and multiple antennas 610 corresponding to antenna arrays, are substantially the same as those described above in relation to FIG. 5. Furthermore, processing system 602, processor 604, and computer-readable medium/memory 624 have many similarities to those so-named components described above in relation to FIG. 5, except for the differences described herein below.

The processor 604 may be configured to perform processing functions for the BS 600, including processing signals received and/or transmitted by the BS 600. That is, in various aspects of the disclosure, the processor 604 may include a full-duplex communication circuit 612, which can function in coordination with full-duplex communication software 632. Here, the full-duplex communication circuit 612 and/or software 632 utilize the transceiver 608 to enable full-duplex communication with one or more other communication devices (e.g., UE 500) utilizing mmWave full-duplex communication techniques. In some configurations, the full-duplex communication circuit 612 is also configured to support half-duplex communication techniques with the one or more other communication devices (e.g., UE 500).

The processor 604 may further include a beam pairing circuit 616, which may function in coordination with beam pairing software 636. Here, the beam pairing circuit 616 and/or software may determine alternative beam pairs for the UE 500 to utilize for full-duplex communication with the BS 600 based on one or more communication parameters, beam parameters, and/or self-interference information. Further, the beam pairing circuit 616 and/or software 636 may function with the full-duplex communication circuit 612 to communicate an alternative beam pair to the UE 500 so that UE 500 can change an existing beam pair to the alternative beam pair. For example, the beam pairing circuit 616 and/or software 636 can generate a message containing an indication of the alternative beam pair to be communicated to the UE 500. The indication of the alternative beam pair can be expressed in terms of reference signal pairing (e.g., a reference signal associated with a DL beam and another reference signal associated with an UL beam).

The processor 604 may further include a beam sweep circuit 618, which may function in coordination with beam sweep software 638. Here the beam sweep circuit 618 and/or software 638 enable the BS 600 to perform periodic/aperiodic beam sweeping operations used to evaluate self-interference of a current beam pair, and to determine alternative beam pairs. In some configurations, the beam sweep circuit 618 and/or software 638 enable the BS 600 to transmit a plurality of reference signals to the UE 500 over a plurality of beam pairs, where each reference signal of the set of reference signals correspond to a different DL beam.

Figure 7:
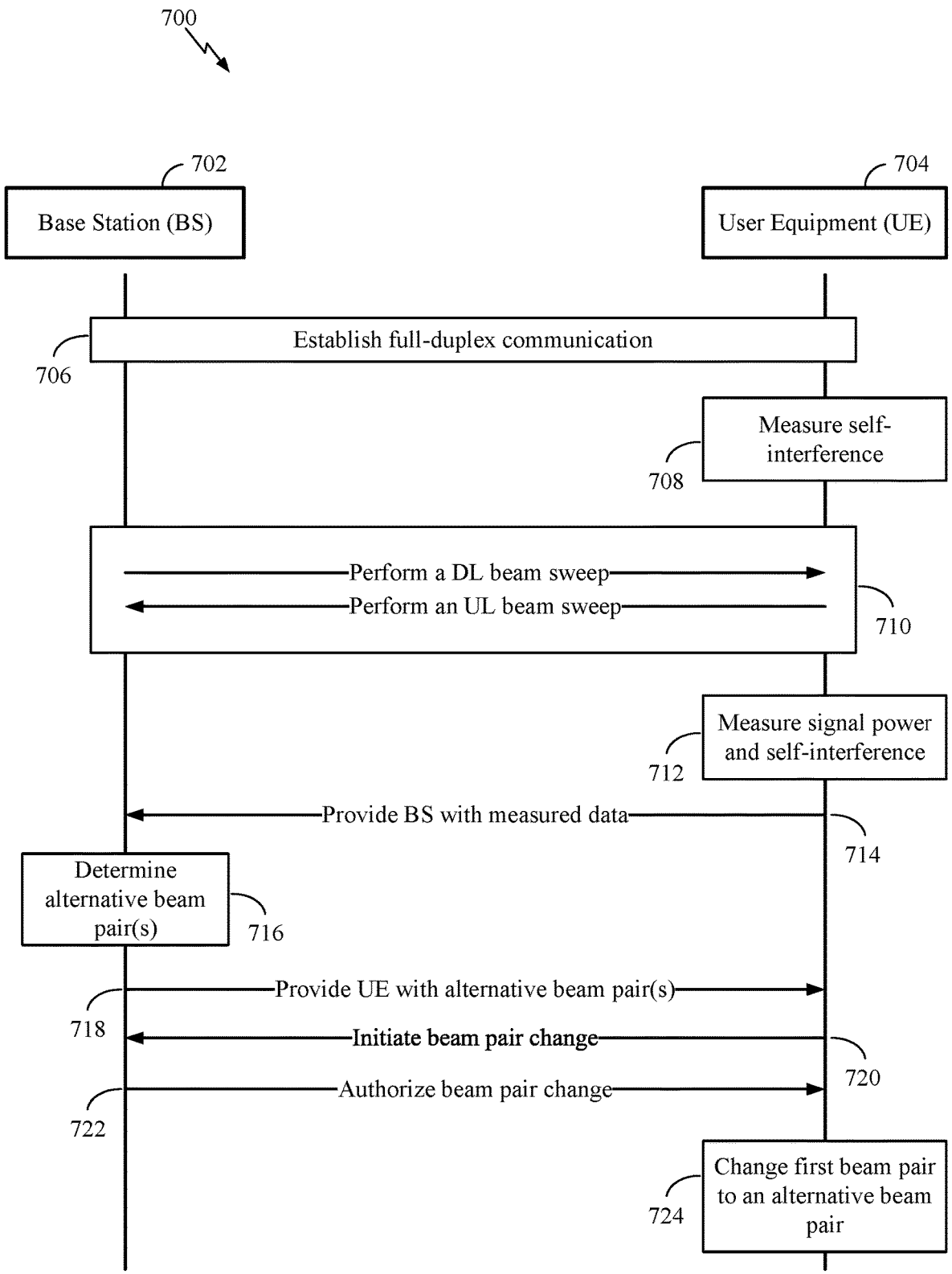
FIG. 7 is a conceptual process flow that supports reduction of self-interference at a UE, in accordance with certain aspects of the present disclosure.

FIG. 7 illustrates an example process flow 700 between a BS 702 and a UE 704 that supports changing a beam pair at a UE 704 in accordance with various aspects of the present disclosure. This example process flow 700 describes aspects and configurations for eliminating or reducing self-interference generated during full-duplex communication at the UE 704.

At a first element 706, the BS 702 and UE 704 utilize corresponding full-duplex communication circuitry (612 and 512, respectively) to establish communication utilizing mmWave full-duplex communication techniques. Here, the UE 704 and BS 702 establish a first beam pair to be utilized by the UE 704 to exchange data with the BS 702. The first beam pair includes a first UL beam by which the UE 704 can transmit data, and a first DL beam by which the UE 704 can receive data. The first beam pair may be utilized by the UE 704 to communicate data over one or more of a physical shared channel or a physical control channel. Once the first beam pair is established, there is a need to regularly re-evaluate the first UL beam and the first DL beam due to movements and rotations of the UE 704 or any variation of the channel environment over time (e.g., signal reflection that causes self-interference at the UE 704).

At a second element 708, the UE 704 utilizes self-interference measurement circuitry 514 to measure self-interference caused by signals communicated via the first beam pair. In some configurations, the UE 704 performs one or more measurements (e.g., RSRP) on: (i) a first signal received by the first DL beam at the UE 704, and (ii) a second signal transmitted by the UE 704 over the first UL beam and also received by the UE 704 at the first DL beam. Generally, signals received (e.g., first signal) at the first DL beam of the UE 704, and signals transmitted (e.g., second signal) by the UE 704 over the first UL beam each utilize different reference signals to allow the UE 704 and the BS 702 to distinguish themselves over the full-duplex communication.

In one example, the signal strength (e.g., RSRP) of both the first and second signals are measured simultaneously at the first DL beam of the UE 704. Because the DL beam and the UL beam utilize different reference signals, the UE 704 can determine a degree to which the first DL beam of the UE 704 is receiving interference by comparing the signal strength of the first signal as it is received by the UE 704 with the signal strength of the second signal as it is received by the UE 704. The UE 704 can then determine a degree of self-interference (e.g., an SINR) between signals communicated over the UE's 704 first UL beam and first DL beam. In some configurations, the SINR is a ratio indicative of a degree of self-interference between the power of: (i) the first signal received by the UE's 704 first DL beam, and (ii) the power of the second signal received by the first DL beam of the first beam pair. It should be noted that an SINR is inversely proportional to the level of self-interference experienced at the UE 704. For example, a high SINR is indicative of a low level of self-interference.

At a third element 710, the BS 702 and the UE 704 utilize corresponding beam sweep circuitry (618 and 518, respectively) to perform beam sweeping operations. Such techniques are aimed, in part, at evaluating whether one or more alternative beams can reduce the self-interference and improve the quality of signals transmitted and received utilizing the first beam pair.

For example, the BS 702 may periodically initiate beam sweeping operations by performing a BS-side DL beam sweeping operation. In the DL beam sweeping operation, the BS 702 sequentially transmits a set of reference signals, wherein each reference signal is transmitted over a separate BS-side DL beam. Accordingly, BS 702 utilizes a plurality of BS-side DL beams to transmit one of the set of reference signals over each beam. The UE 704 receives the reference signals via a plurality of UE-side DL beams, and performs a signal strength measurement (e.g., RSRP) on each reference signal received.

The UE 704 may periodically perform a UE-side UL beam sweeping operation by sequentially transmitting signaling (e.g., reference signals) over a plurality of UE-side UL beams. It should be noted that the BS 702 may not receive or provide any feedback in response to the signaling of UE's 704 beam sweep operation. Instead, the UE 704 performs the UL beam sweeping operation to determine a degree of self-interference between the plurality of UL beams at the UE 704 and a plurality of UE-side DL beams.

In one example, the UE 704 sequentially transmits signaling over a plurality of UE-side UL beams, while simultaneously measuring the degree to which the transmitted signaling is received by a plurality of UE-side DL beams. Accordingly, the UE 704 can determine which UE-side UL beam(s) of the plurality of UL beams and which DL beam(s) of the plurality of DL beams can be paired to generate the least amount of self-interference at the UE 704.

In another example, while performing the UL beam sweeping operation, the first DL beam of the first beam pair at the UE 704 remains fixed so that any degree of self-interference caused by the plurality of UL beams are captured by the first DL beam. Accordingly, the UE 704 can determine which UE-side UL beam(s) of the plurality of UL beams can be paired with the first DL beam to generate the least amount of self-interference at the UE 704.

In some configurations, the DL beam sweeping operation performed by the BS 702 is performed simultaneously with the UL beam sweeping operation performed by UE 704. Here, the UE 704 measures the signal strength of reference signals transmitted over the DL beams of the BS 702 and received by a plurality of UE-side DL beams. The UE 704 also measures the signal strength of reference signals transmitted over UE-side UL beams and received by the plurality of UE-side DL beams. The UE 704 can then determine a signal-to-noise ratio (e.g., SINR) of the received signals.

For example, at a fourth element 712 of FIG. 7, the UE 704 is configured to measure two RSRPs: a first RSRP associated with the reference signals received by the plurality of UE-side DL beams that were transmitted from the DL beam sweep performed by the BS 702, and a second RSRP associated with reference signals also received by the plurality of UE-side DL beams that were transmitted during the UL beam sweep performed by the UE 704.

In some configurations, the UE 704 determines an SINR value corresponding to each of the UE-side DL beams used in the DL beam sweep and each of the UE-side UL beams used in the UL beam sweep. Accordingly, in some examples, the UE 704 determines a plurality of SINR values corresponding to a plurality of beam pairs (i.e., a pair of a UE-side DL beam and a UE-side UL beam). The UE 704 then compares each determined SINR value of each of the plurality of beam pairs to an SINR value of the first beam pair to determine whether one or more of the plurality of beam pairs have an increased SINR value relative to the SINR of the first beam pair. In some examples, a determination that one or more of the plurality of beam pairs have the increased SINR triggers the UE 702 to initiate a beam pair change described in more detail below.

In some configurations, beam sweeping operations are triggered by the UE 704 after measuring self-interference at the second element 708 of FIG. 7. That is, the UE 704 may determine that self-interference by the first UL beam at the first DL beam of UE 704 (e.g., one or more of an RSRP value or an SINR value) is indicative of an unacceptable level of self-interference, and proceed to transmit a message to the BS 702 utilizing the first UL beam to initiate the DL beam sweep operation by the BS 702. For example, one or more of the BS 702 or the UE 704 may include a look-up table configured to indicate whether the measured self-interference is acceptable for communication based on a reliability or quality of service requirement.

The reference signals communicated over the beams in the beam sweep operation include different types and patterns of reference signals. In some configurations, the reference signals can include any of a demodulation reference signal (DM-RS), a channel state information reference signal (CSI-RS), a sounding reference signal (SRS), a positioning reference signal (PRS), etc. The BS 702 and the UE 704 may be configured to identify particular beams according to type and/or pattern of a corresponding reference signal. That is, beam pairing can be expressed in terms of reference signal pairing (e.g., a reference signal associated with a DL beam and another reference signal associated with an UL beam).

At a fifth element 714, the UE 704 utilizes the beam sweep circuit 518 to generate a report containing self-interference information measured at one or more of the second element 708 or the fourth element 712. The UE transmits the report utilizing the full-duplex communication circuit 512 to the BS 702. In some configurations, the UE 704 transmits the report using the first UL beam of the first beam pair. The reported data may include one or more of: an identification of a reference signal received from the BS 702 during the DL beam sweep having the best signal strength measurement (e.g., RSRP) relative to the other reference signals from the DL beam sweep, the measured signal strength for the reference signal, an identification of a UE-side DL beam that the signal strength was calculated from (e.g., the first DL beam), or other self-interference information (e.g., SINR information corresponding to signals transmitted and received over the first beam pair). The UE 704 utilizes the full-duplex communication circuit 512 to transmit the report to the BS 702.

In some configurations, the UE 704 transmits the report to the BS 702 utilizing another UE-side UL beam configured for half-duplex communication with the BS 702.

At a sixth element 716, the BS 702 determines one or more alternative beam pairs that the UE 704 can use as an alternative to the first beam pair. The BS 702 may determine an alternative beam pair based on one or more communication parameters, beam parameters, and/or self-interference information received from the UE 704. It should be noted that there is a one-to-one correspondence between a reference signal and a beam, and only certain pairs of reference signals (e.g., DL reference signal and UL reference signal) can be used in a full-duplex communication system. Accordingly, the BS 702 also determines whether a particular pair of reference signals can be transmitted and received at the same time and in the same frequency channel. For example, an alternative beam pair may include a second DL beam and a second UL beam, each having a different reference signal. In some configurations, the BS also determines an alternative beam pair based on whether the alternative beam pair will be used to communicate data over one or more of a physical shared channel or a physical control channel. That is, the alternative beam pair may be configured for communication over one or both of the physical shared channel or the physical control channel.

At a seventh element 718, the BS 702 utilizes the full-duplex communication circuit 612 to communicate one or more determined alternative beam pair(s) to the UE 704. In some configurations, the communication is configured to identify the alternative beam pairs in terms of their corresponding reference signals. The communication is configured to be received at the UE 704 by the first DL beam of the first beam pair.

In some configurations, the communication includes an identification of an alternative beam pair and an implied authorization for the UE 704 to change the first beam pair to the identified alternative beam pair. That is, the UE 704 will change the first beam pair to the alternative beam pair upon receiving the communication, and will proceed to utilize the alternative beam pair in future communications with the BS 702. Accordingly, the steps described in later elements of FIGS. 7 (720 and 722) can be omitted in such a configuration.

In other configurations, the BS 702 communication that identifies the one or more alternative beam pairs is configured to provide the UE 704 with an opportunity to first select an alternative beam pair before switching from the first beam pair. That is, the communication does not include an authorization from the BS 702 to proceed with a beam pair change. Accordingly, the steps described in later elements of FIGS. 7 (720 and 722) may be required in such a configuration.

At an eighth element 720, the UE 704 initiates a change from the first beam pair to an alternative beam pair by communicating a request to change the first beam pair to an alternative beam pair, to the BS 702. The UE 704 communicates the request to the BS 702 utilizing the first UL beam of the first beam pair. In some configurations, the request identifies one or more alternative beam pairs that the UE 704 has selected to be used as the alternative beam pair. That is, the UE 704 selects the alternative beam pair from the one or more alternative beam pairs identified in the communication from the BS 702. In another example, the UE 704 selects one or more alternative beam pairs that are not identified in the BS 702 communication. For example, the UE may select an alternative beam pair that is identified in a previous communication from the BS 702. In some configurations, the UE 704 communicates the request to the BS 702 utilizing another UE-side UL beam configured for half-duplex communication with the BS 702.

In some configurations, the UE 704 may utilize the beam pairing circuit 516 to independently determine one or more alternative beam pairs based on self-interference measurements performed on beam sweep operations. For example, the UE 704 determines an alternative beam pair based on the measurement data measured at one or more of element 708 or element 712, and whether a particular pair of reference signals can be transmitted and received at the same time and in the same frequency channel. In some configurations, the UE 704 may determine the alternative beam pair based in part on one or more communication parameters of the full-duplex communication and/or beam parameters of the alternative beam pair(s).

In some configurations, the UE 704 utilizes beam pairing circuit 516 to determine an alternative beam pair based on whether the alternative beam pair is required to communicate data over one or more of a physical shared channel and/or a physical control channel. For example, the first beam pair may be utilized by UE 704 to communicate over both a physical shared channel and a physical control channel. However, the UE 704 may determine that data communicated over the physical shared channel requires more isolation from self-interference than the first beam pair provides. That is, the request to change the first beam pair may include a request to change the first beam pair for communication over one of the physical shared channel or the physical control channel, but not to change the first beam pair for communication over the other. Of course, the request may also be directed to changing both of the physical shared channel and the physical control channel.

In some configurations, the UE 704 may initiate a change from the first beam pair to the alternative beam pair by communicating a message to the BS 702 indicating a determination to change the first beam pair to an alternative beam pair identified in the message. That is, the UE 704 does not request authorization to change the first beam pair, but rather provides the BS 702 with an identified beam pair, over which future communications between the UE and the BS will be conducted. For example, the BS is configured to treat the UE's 704 message as authorization for the UE to change the first beam pair to an alternative beam pair. That is, the BS 702 will maintain full-duplex communication with the UE 704 according the parameters of the alternative beam pair identified in the UE's 704 message. In this configuration, the UE 704 communicates the message to the BS 702 utilizing the first UL beam of the first beam pair. Accordingly, a later element 722 shown in FIG. 7 can be omitted in such a configuration.

At a ninth element 722, and upon receiving a request from the UE 704 to change the first beam pair to an identified alternative beam pair, the BS 702 may determine whether to authorize the change. If the BS 702 determines to authorize the change, then the BS 702 communicates a message to the UE 704 authorizing the change. The message is configured to be received by the first UL beam of the first beam pair utilized by the UE 704, and may include an indication of the alternative beam pair. For example, the message may include an identification of one or more reference signals corresponding to one or more beams of the alternative beam pair. In this example, the UE 704 may include a look-up table configured to indicate a particular beam identifiable by a particular reference signal. At a tenth element 724, the UE 704 utilizes a beam pairing circuit 516 to change from the first beam pair to the alternative beam pair, maintaining the full-duplex communication with the BS 702.

Figure 8:
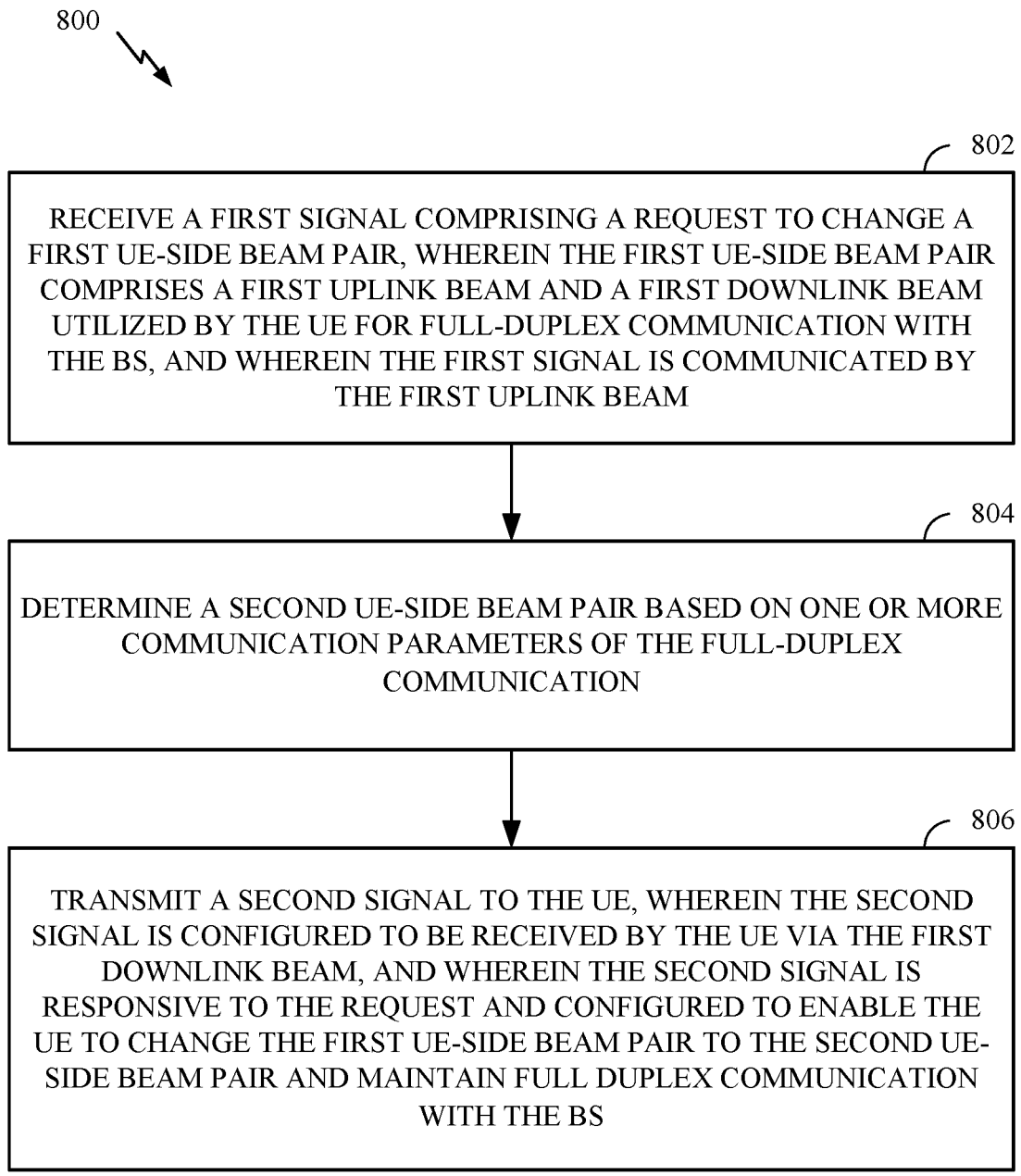
FIG. 8 is a flow diagram illustrating example operations for wireless communication by a BS, in accordance with certain aspects of the present disclosure.

FIG. 8 is a flow diagram illustrating an exemplary process 800 for managing self-interference at a UE configured for full-duplex wireless communication, in accordance with certain aspects of the present disclosure. The process 800 may be performed, for example, by a BS (e.g., such as a BS 110 of FIGS. 1 and 2, BS 600 of FIG. 6, BS 702 of FIG. 7). The process 800 may be implemented as software components stored on a memory (e.g., memory 242 of FIG. 2, computer-readable medium/memory 624 FIG. 6) that are executed and run on one or more processors (e.g., controller/processor 240 of FIG. 2, controller/processor 604 of FIG. 6). Further, the transmission and reception of signals by the BS in exemplary process 800 may be enabled, for example, by one or more antennas (e.g., antennas 234a through 234t of FIG. 2, antennas 610 of FIG. 6). In certain aspects, the transmission and/or reception of signals by the BS may be implemented via a bus interface of one or more processors obtaining and/or outputting signals.

The process 800 may begin at block 802, by receiving a first signal comprising a request to change a first UE-side beam pair. The first UE-side beam pair includes a first UL beam and a first DL beam utilized by the UE for full-duplex communication with the BS. The first signal is communicated by the first UL beam.

At block 804, the BS determines a second UE-side beam pair based on one or more communication parameters of the full-duplex communication.

At block 806, the BS transmits a second signal to the UE. The second signal is responsive to the request and configured to enable the UE to change the first UE-side beam pair to the second UE-side beam pair, and configured to be received by the UE via the first DL beam. Accordingly, the BS can maintain full-duplex communication with the UE by utilizing the second UE-side beam pair.

Figure 9:
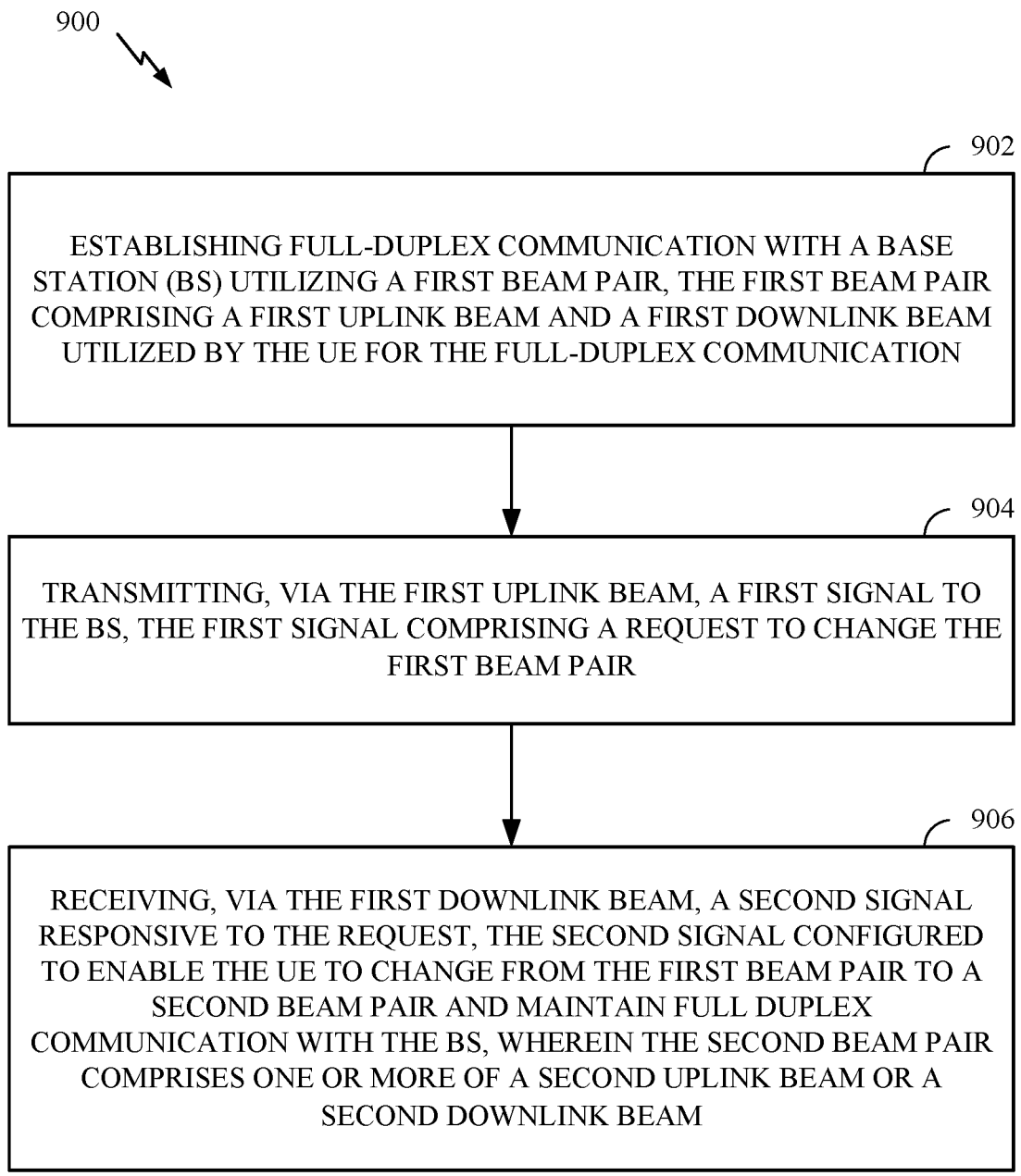
FIG. 9 is a flow diagram illustrating example operations for wireless communication by a UE, in accordance with certain aspects of the present disclosure.

FIG. 9 is a flow diagram illustrating an exemplary process 900 for managing self-interference at a UE configured for full-duplex wireless communication, in accordance with certain aspects of the present disclosure. The process 900 may be performed, for example, by a UE (e.g., such as a UE 120 of FIGS. 1 and 2, UE 500 of FIG. 5, UE 704 of FIG. 7). The process 900 may be implemented as software components stored on a memory (e.g., memory 282 of FIG. 2, computer-readable medium/memory 524 FIG. 5) that are executed and run on one or more processors (e.g., controller/processor 280 of FIG. 2, controller/processor 504 of FIG. 6). Further, the transmission and reception of signals by the UE in exemplary process 900 may be enabled, for example, by one or more antennas (e.g., antennas 252a through 252r of FIG. 2, antenna elements 510 of FIG. 5). In certain aspects, the transmission and/or reception of signals by the UE may be implemented via a bus interface of one or more processors obtaining and/or outputting signals.

The process 900 may begin at block 902, by establishing full-duplex communication with a BS utilizing a first beam pair, the first beam pair comprising a first uplink beam and a first downlink beam utilized by the UE for the full-duplex communication.

At block 904, the UE transmits, via the first uplink beam, a first signal to the BS, the first signal comprising a request to change the first beam pair.

At block 906, the UE receives, via the first downlink beam, a second signal responsive to the request, the second signal configured to enable the UE to change from the first beam pair to a second beam pair and maintain full duplex communication with the BS, wherein the second beam pair includes one or more of a second uplink beam or a second downlink beam.

ADDITIONAL CONSIDERATIONS

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 5-9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for managing user equipment (UE) self-interference by a base station (BS), comprising:
   receiving, from the UE, a first signal comprising a request to change a first beam pair, wherein the first beam pair comprises a first uplink beam and a first downlink beam utilized by the UE for full-duplex communication with the BS;
   determining a second beam pair based on one or more communication parameters of the full-duplex communication; and
   transmitting a second signal to the UE, wherein the second signal is responsive to the request and configured to enable the UE to change the first beam pair to the second beam pair and maintain the full-duplex communication with the BS.

2. The method of claim 1, wherein the one or more communication parameters comprise one or more of:
   (i) which antenna array of a plurality of antenna arrays on the UE is used for the full-duplex communication with the BS;

(ii) whether the first beam pair is utilized by the UE to communicate data over a physical shared channel, a physical control channel, or both;
(iii) whether the second beam pair is to be utilized by the UE to communicate data over the physical shared channel, the physical control channel, or both;
(iv) one or more beam parameters of the first beam pair; or
(v) one or more beam parameters of the second beam pair.

3. The method of claim 2, wherein the one or more beam parameters comprise one or more of a beam direction, a transmission power, a beam width, a signal-to-noise ratio (SNR), or a beam side lobe strength.

4. The method of claim 1, wherein the second beam pair comprises a second uplink beam and a second downlink beam, wherein the second uplink beam comprises a first reference signal (RS), and wherein the second downlink beam comprises a second RS.

5. The method of claim 1, further comprising:
transmitting a plurality of reference signals (RSs), wherein each RS is communicated to the UE via one of a plurality of downlink beams;
receiving a first report from the UE in response to transmission of the RSs, the first report indicating:
one or more alternative beam pairs, wherein each of the one or more alternative beam pairs are configured to be utilized by the UE, and
a quality of each of the one or more alternative beam pairs, wherein the quality is based at least on a self-interference measurement made using one or more of the plurality of RSs;
determining which of the one or more alternative beam pairs the UE can utilize to maintain the full-duplex communication with the BS; and
transmitting a second report to the UE identifying the determined one or more alternative beam pairs, wherein the second report includes the second beam pair.

6. The method of claim 5, wherein the request to change the first beam pair is responsive to the second report and comprises a selection of the second beam pair by the UE, the method further comprising determining the second beam pair based in part on the UE selection.

7. The method of claim 5, further comprising receiving a third signal from the UE, the third signal configured to trigger transmission of the plurality of RSs.

8. The method of claim 5, further comprising transmitting the plurality of RSs via the plurality of downlink beams to the UE at regular intervals.

9. A base station (BS) configured for managing self-interference at a user equipment (UE), comprising:
a memory; and
a processor communicatively coupled to the memory, wherein the processor is configured to:
receive, from the UE, a first signal comprising a request to change a first beam pair, wherein the first beam pair comprises a first uplink beam and a first downlink beam utilized by the UE for full-duplex communication with the BS;
determine a second beam pair based on one or more communication parameters of the full-duplex communication; and
transmit a second signal to the UE, wherein the second signal is responsive to the request and configured to enable the UE to change the first beam pair to the second beam pair and maintain the full-duplex communication with the BS.

10. The BS of claim 9, wherein the one or more communication parameters comprise one or more of:
(i) which antenna array of a plurality of antenna arrays on the UE is used for the full-duplex communication with the BS;
(ii) whether the first beam pair is utilized by the UE to communicate data over a physical shared channel, a physical control channel, or both;
(iii) whether the second beam pair is to be utilized by the UE to communicate data over the physical shared channel, the physical control channel, or both;
(iv) one or more beam parameters of the first beam pair; or
(v) one or more beam parameters of the second beam pair.

11. The BS of claim 10, wherein the one or more beam parameters comprise one or more of a beam direction, a transmission power, a beam width, a signal-to-noise ratio (SNR), or a beam side lobe strength.

12. The BS of claim 9, wherein the second beam pair comprises a second uplink beam and a second downlink beam, wherein the second uplink beam comprises a first reference signal (RS), and wherein the second downlink beam comprises a second RS.

13. The BS of claim 9, wherein the processor is further configured to:
transmit a plurality of reference signals (RSs), wherein each RS is communicated to the UE via one of a plurality of downlink beams;
receive a first report from the UE in response to transmission of the RSs, the first report indicating:
one or more alternative beam pairs, wherein each of the one or more alternative beam pairs are configured to be utilized by the UE, and
a quality of each of the one or more alternative beam pairs, wherein the quality is based at least on a self-interference measurement made using one or more of the plurality of RSs;
determine which of the one or more alternative beam pairs the UE can utilize to maintain the full-duplex communication with the BS; and
transmit a second report to the UE identifying the determined one or more alternative beam pairs, wherein the second report includes the second beam pair.

14. The BS of claim 13, wherein the request to change the first beam pair is responsive to the second report and comprises a selection of the second beam pair by the UE, and wherein the processor is further configured to determine the second beam pair based in part on the UE selection.

15. The BS of claim 13, wherein the processor is further configured to receive a third signal from the UE, the third signal configured to trigger the processor to transmit the plurality of RSs.

16. The BS of claim 13, wherein the processor is further configured to transmit the plurality of RSs via the plurality of downlink beams to the UE at regular intervals.

17. A method of managing self-interference by a user equipment (UE), comprising:
establishing full-duplex communication with a base station (BS) utilizing a first beam pair, the first beam pair comprising a first uplink beam and a first downlink beam utilized by the UE for the full-duplex communication;
transmitting a first signal to the BS, the first signal comprising a request to change the first beam pair; and
receiving a second signal responsive to the request, the second signal configured to enable the UE to change from the first beam pair to a second beam pair and maintain the full-duplex communication with the BS, wherein the second beam pair comprises one or more of a second uplink beam or a second downlink beam.

18. The method of claim 17, further comprising:
transmitting a third signal to the BS; and
determining a first signal-to-self-interference and noise ratio (SINR) of the third signal, the first SINR indicative of self-interference between the first uplink beam and the first downlink beam.

19. The method of claim 18, further comprising determining the first SINR by utilizing a plurality of downlink beams to measure the transmitted third signal.

20. The method of claim 18, further comprising:
selecting a plurality of beam pairs, wherein each of the plurality of beam pairs include an uplink beam and a downlink beam;
transmitting a signal to the BS via the uplink beam of each of the plurality of beam pairs;
determining an SINR of each of the plurality of beam pairs; and
comparing the SINR of each of the plurality of beam pairs to the first SINR to determine whether one or more of the plurality of beam pairs have an increased SINR relative to the first SINR, wherein a determination that one or more of the plurality of beam pairs have the increased SINR triggers transmission of the first signal comprising the request.

21. The method of claim 20, wherein the request to change the first beam pair comprises an indication of one or more beam pairs of the plurality of beam pairs having the increased SINR.

22. The method of claim 17, further comprising:
receiving a plurality of reference signals (RSs), wherein each of the plurality of RSs is transmitted by the BS via one of a plurality of beams, and wherein each RS is configured to identify a corresponding one of the plurality of beams;
performing a reference signal received power (RSRP) measurement to determine an RSRP value of the received RSs; and
transmitting a first report to the BS indicating the RSRP value of each of the received RSs; and
receiving, from the BS, a second report configured to identify one or more beam pairs based on the first report, wherein each of the one or more beam pairs comprise a uplink beam and a downlink beam that the UE can utilize to maintain the full-duplex communication with the BS.

23. The method of claim 17, wherein the second signal is configured to enable the UE to change from the first beam pair to the second beam pair by identifying a reference signal (RS) corresponding to each of the second uplink beam or the second downlink beam.

24. A user equipment (UE) configured for managing self-interference in a full-duplex communication, comprising:
a memory; and
a processor communicatively coupled to the memory, wherein the processor is configured to:
establish full-duplex communication with a base station (BS) utilizing a first beam pair, the first beam pair comprising a first uplink beam and a first downlink beam utilized by the UE for the full-duplex communication;
transmit a first signal to the BS, the first signal comprising a request to change the first beam pair; and
receive a second signal responsive to the request, the second signal configured to enable the UE to change from the first beam pair to a second beam pair and maintain the full-duplex communication with the BS, wherein the second beam pair comprises one or more of a second uplink beam or a second downlink beam.

25. The UE of claim 24, wherein the processor is further configured to:
transmit a third signal to the BS; and
determine a first signal-to-self-interference and noise ratio (SINR) of the third signal, the first SINR indicative of self-interference between the first uplink beam and the first downlink beam.

26. The UE of claim 25, wherein the processor is further configured to determine the first SINR by utilizing the first downlink beam to measure the transmitted third signal.

27. The UE of claim 25, wherein the processor is further configured to:
select a plurality of beam pairs, wherein each of the plurality of beam pairs include an uplink beam and a downlink beam;
transmit a signal to the BS via the uplink beam of each of the plurality of beam pairs;
determine an SINR of each of the plurality of beam pairs; and
compare the SINR of each of the plurality of beam pairs to the first SINR to determine whether one or more of the plurality of beam pairs have an increased SINR relative to the first SINR, wherein a determination that one or more of the plurality of beam pairs have the increased SINR triggers transmission of the first signal comprising the request.

28. The UE of claim 27, wherein the request to change the first beam pair comprises an indication of one or more beam pairs of the plurality of beam pairs having the increased SINR.

29. The UE of claim 24, wherein the processor is further configured to:
receive a plurality of reference signals (RSs), wherein each of the plurality of RSs is transmitted by the BS via one of a plurality of beams, and wherein each RS is configured to identify a corresponding one of the plurality of beams;
perform a reference signal received power (RSRP) measurement to determine an RSRP value of the received RSs; and
transmit a first report to the BS indicating the RSRP value of each of the received RSs; and
receive, from the BS, a second report configured to identify one or more beam pairs based on the first report, wherein each of the one or more beam pairs comprise a uplink beam and a downlink beam that the UE can utilize to maintain the full-duplex communication with the BS.

30. The UE of claim 24, wherein the second signal is configured to enable the UE to change from the first beam pair to the second beam pair by identifying a reference signal (RS) corresponding to each of the second uplink beam or the second downlink beam.

* * * * *